United States Patent
Hsu

(10) Patent No.: US 6,758,588 B2
(45) Date of Patent: Jul. 6, 2004

(54) OPTICAL FIBER LIGHT

(75) Inventor: Henry T. H. Hsu, Old Westbury, NY (US)

(73) Assignee: American Auto Accessories, Corona, NY (US)

( * ) Notice: Subject to any disclaimer, the term of this patent is extended or adjusted under 35 U.S.C. 154(b) by 0 days.

(21) Appl. No.: 10/213,707

(22) Filed: Aug. 6, 2002

(65) Prior Publication Data

US 2004/0027837 A1 Feb. 12, 2004

(51) Int. Cl.[7] .................................................. B60Q 1/56
(52) U.S. Cl. ........................ 362/497; 362/31; 362/158; 362/577; 362/582
(58) Field of Search ................................. 302/109, 511, 302/497, 551, 158, 31, 556, 554, 577, 582

(56) References Cited

U.S. PATENT DOCUMENTS

| | | | | |
|---|---|---|---|---|
| 3,749,901 A | * | 7/1973 | Clough | 362/562 |
| 5,086,378 A | * | 2/1992 | Prince | 362/103 |
| 5,967,638 A | * | 10/1999 | Gorman et al. | 362/84 |
| 6,095,661 A | | 8/2000 | Lebens et al. | 362/184 |
| 6,265,984 B1 | | 7/2001 | Molinaroli | 340/815.4 |
| 6,305,818 B1 | | 10/2001 | Lebens et al. | 362/184 |
| 6,357,890 B1 | | 3/2002 | Parsons et al. | 362/116 |

* cited by examiner

*Primary Examiner*—John Anthony Ward
(74) *Attorney, Agent, or Firm*—Robert C. Kain, Jr.; Fleit, Kain

(57) ABSTRACT

An optical fiber light includes a light source, a dispersion medium, a power supply, and at least one light tube disposed coaxially along a longitudinal axis of symmetry of the dispersion medium. The light source is integrated with the dispersion medium so that light emitted from the light source is received along the longitudinal axis of symmetry of the dispersion medium. The light tube distributes light along the length of the dispersion medium. Distributed light radiates from the light tube along the length of the dispersion medium.

2 Claims, 6 Drawing Sheets

OPTICAL FIBER LIGHT

BACKGROUND OF THE INVENTION

1. Field of the Invention

The invention generally relates to illuminated fiber optic lights and more specifically to lights with transparent rods and optical fiber disposed therein.

2. Description of the Related Art

To enhance both the usability and lifetime of an illuminated device several design considerations have been employed to integrate a light source with a light diffusing medium. A typical light diffusing medium is a cone attached to the illuminating end of a flashlight. The cone diffuses light so that light emanates in both a linear and normal direction from the light source and causes light to radiate from the cone. Typical applications include semaphores as are used to guide airplanes to gates by ground crew. The light illuminating the walls of the cones makes it easier for pilots to see the semaphores. Design considerations for semaphores and other lights with light diffusing medium include minimizing power consumption and maximizing light source life span. This can be realized by integrating light sources that have low power requirements and which operate with high efficiency. An additional design considerations is to enhance durability thereby enhancing the usefulness of the device. This can be realized by reducing and/or eliminating frangible components integrated into the device design.

The most frequent application of a light source in a diffusion medium is a high intensity light such as: filament; halogen; krypton; and xenon, with a diffusion medium such as a light reflector. A typical application is a hand held flashlight where the light from the source is focused by a reflector positioned behind the light source. There are several problems associated with this type of design. First, the high intensity light source consumes more power and therefore must be compensated for with a larger capacity power source. Second, if a smaller capacity power source is used the useful lifetime of the device is reduced. Lastly, the beam of light is often focused into a narrow column which minimizes light dispersion. Cones have been adapted for flashlights, as described above, however this only results in improving the area of light dispersion. Furthermore, the cone is not an integral component of the flashlight. Accordingly, a need exists to overcome these problems and to provide an illuminating device which uses low power and that provides a large area of light dispersion.

Other designs have integrated low power light sources such as light-emitting diodes (LED's) with designs similar to that described above. To enhance illumination a plurality of LED's are typically used resulting in greater power consumption and attendant power supply concerns. Additionally, light reflectors are integrated into the design to enhance illumination resulting in a focused column of light and corresponding reduction in light dispersion. Accordingly, a need exists to provide an illuminating device using low power light sources, such as LED's, to improve power consumption and that provides a large area of light dispersion.

Illuminating devices have been designed to include fluorescent lights. This type of device requires more power than similar designs using low power light sources and can be characterized by a reduction in the overall durability of the illuminating device. To enhance durability additional support and protective features are employed such as bulb casings and light enclosures. This results in increased size and weight of the device reducing design options. Accordingly, a need exists to provide an illuminating device which is durable, light weight, and low power consuming.

Illuminating devices have also been designed to include neon tubes. This type of design is similar to the fluorescent light design and has the same deficiency in power consumption and durability. The increase in power requirements and the reduction in durability is prohibitive to design options. Accordingly, a need exists to provide an illuminating device with a large area of light dispersion which provides a low power high efficiency light source with a durable, light weight dispersion medium with superior durability.

SUMMARY OF THE INVENTION

Briefly, in accordance with the present invention, disclosed is an optical light apparatus comprising at least one light source, a transparent rod, a power source interface, and a casing enclosing the light source and the power source interface. The casing couples the transparent rod and the light source so that light emitted from the light source enters the transparent rod along a longitudinal axis of symmetry of the transparent rod. One or more light tubes are disposed concentrically on the longitudinal axis of symmetry of the transparent rod. The light tubes comprise optical fibers or channels. The light tubes distribute light along the length of the transparent rod. Distributed light radiates from the light tubes illuminating the transparent rod. In one embodiment of the present invention the optical light apparatus is structured as a hand held light wand. In another embodiment of the present invention the optical light apparatus is structured as a mountable light. In still another embodiment of the present invention the optical light apparatus is structured as a license plate frame.

BRIEF DESCRIPTION OF THE DRAWINGS

The subject matter that is regarded as the invention is particularly pointed out and distinctly claimed in the claims at the conclusion of the specification. The foregoing and other features, and advantages of the invention will be apparent from the following detailed description taken in conjunction with the accompanying drawings. Additionally, the left-most digit of a reference number identifies the drawing in which the reference number first appears.

DETAILED DESCRIPTION OF THE PREFERRED EMBODIMENTS

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

The present invention, according to a preferred embodiment, overcomes drawbacks and problems with the prior art by coupling a light emitting diode with a transparent rod wherein light tubes are disposed within the transparent rod enhancing illumination of the transparent rod. A preferred embodiment and several alternate embodiments describing variations of the present invention are now described.

Figure 1:
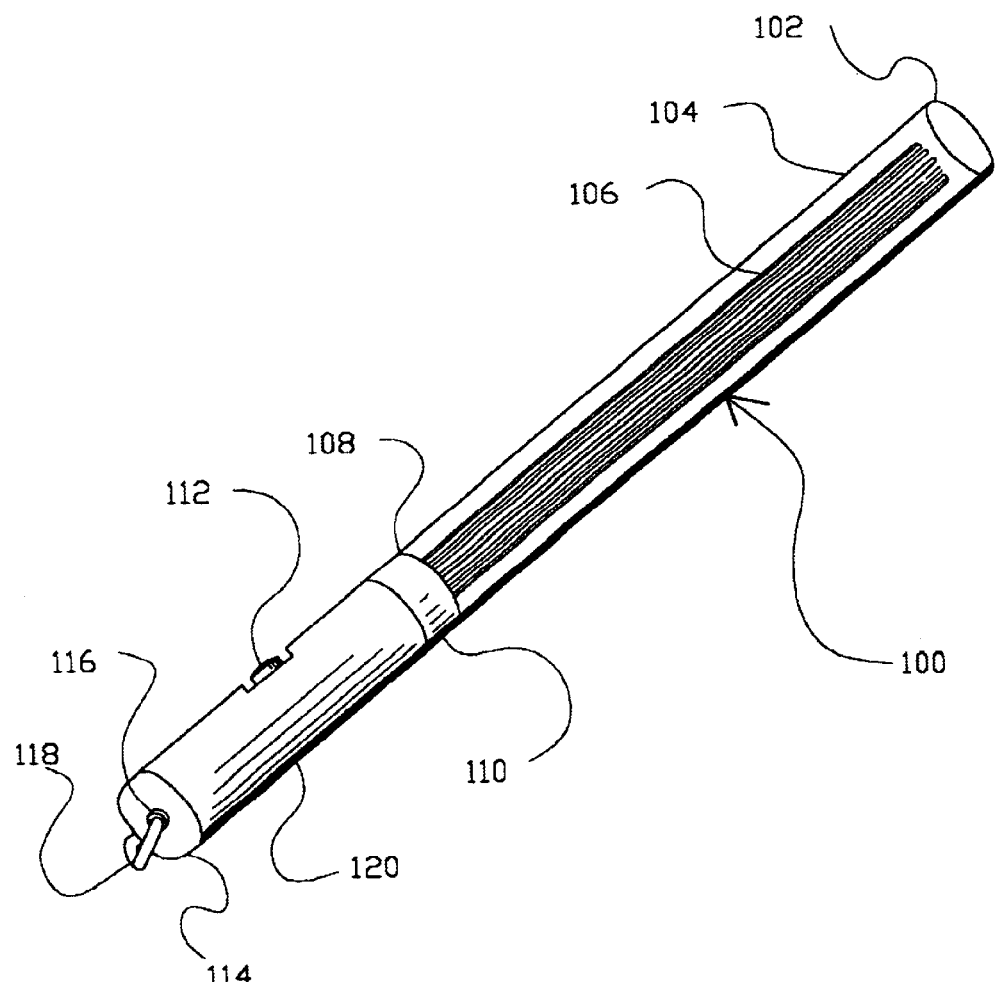
FIG. 1 is an elevated view of an optical fiber light embodied as a hand held wand, according to the present invention.

FIG. 1 is an elevated view of an optical fiber light 100 according to one embodiment of the present invention. Referring to FIG. 1, the optical fiber light 100 comprises a transparent rod 104. In another embodiment the optical fiber light 100 comprises a hollow transparent rod (not shown) wherein one or more light tubes 106 are disposed concentrically along a longitudinal axis of symmetry 402, illustrated in FIG. 4, of the hollow transparent rod. The light tubes 106 are optical fibers or channels for carrying the light along the length of the transparent rod 104. Light from the light source enters one end 108 of the transparent rod 104 and is emitted from an opposite end 102. Light radiates along the length of the light tubes 106 illuminating the transparent rod 104. In one embodiment the transparent rod 104 is a geometric shape such as rectangular or triangular (not shown). In still another embodiment the transparent rod 104 is etched with a design logo or name so as to be "backlit" (not shown). The transparent rod 104 is manufactured from plastic and/or glass. In the embodiment where the transparent rod 104 is hollow the hollow transparent rod contains a light permeable gel or light permeable gas (not shown). The transparent rod 104 is coupled to a casing 120. A collar fastener 110 is used for extra support. The casing 120 and collar fastener 110 are manufactured from metal and/or plastic. A switch 112 is housed in the casing 120. The switch 112 is accessible permitting operation of the switch 112 external to the casing 120. The switch 112 is electrically coupled to a light source 202, illustrated in FIG. 2, and a power source interface. The switch 112 is a momentary switch and is operable in two positions: on; and off. In an alternative embodiment the switch 112 is a momentary switch and is operable to produce a strobe effect. The power source interface is disposed in the casing 120. The power source interface is electrically coupled to a power source such as one or more batteries, a power supply, a generator, and equivalent. In the embodiment where the power source are batteries, the batteries are placed inside the casing 120. The batteries are of any size batteries and the choice is dependent on power consumption of the light source 202, the desired operating life, and the desired size of the casing 120. A fitting 114 is disposed in an access opening 208, illustrated in FIG. 2, of the casing 120. The fitting 114 is a cap with threads 206, illustrated in FIG. 2. In another embodiment the fitting 114 is a compression fitting (not shown). In still another embodiment the cap is secured with a set screw (not shown). The fitting 114 is constructed with an opening 116 suitable for attaching a ring fastener 118.

Figure 2:
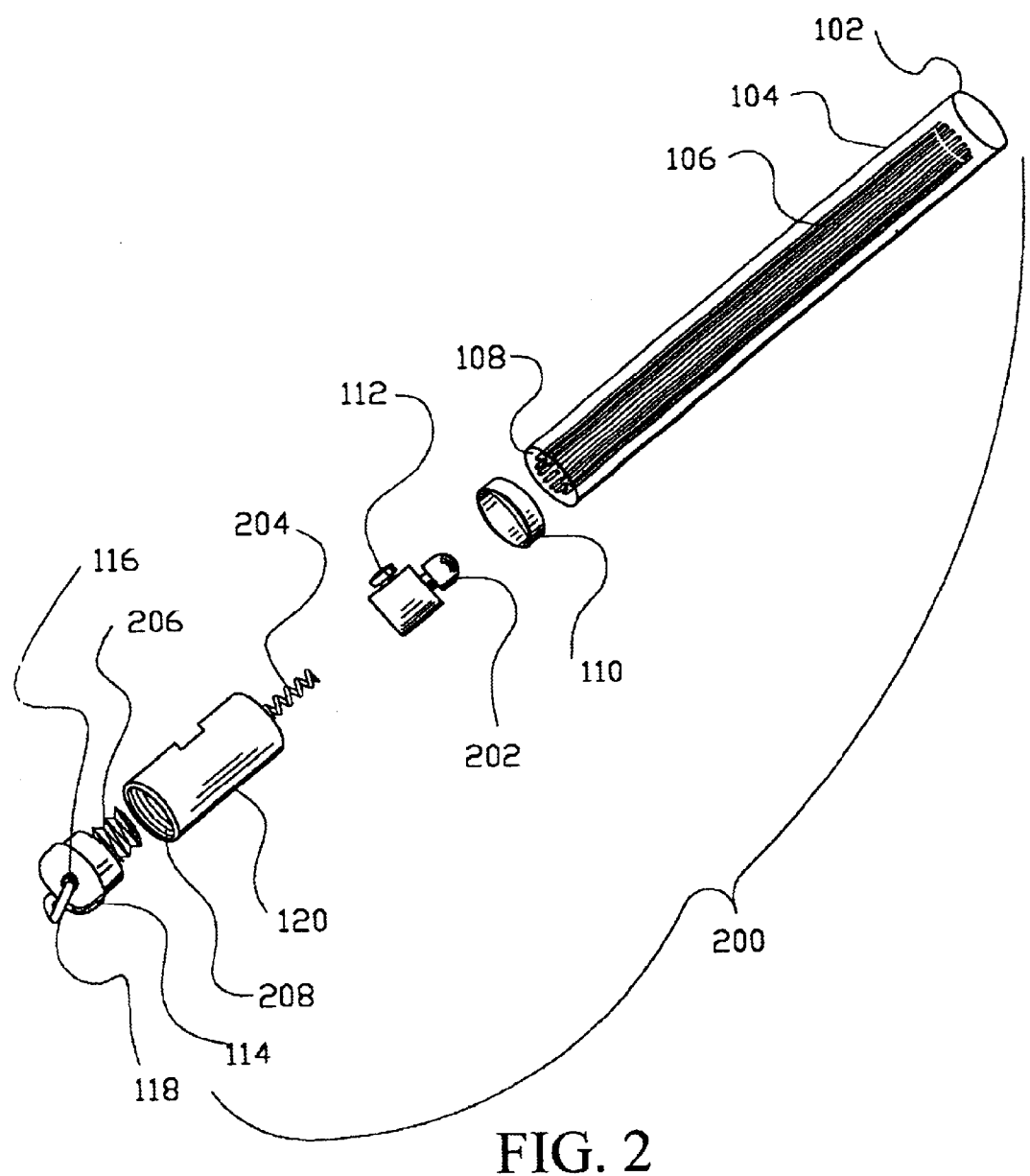
FIG. 2 is an exploded side view of FIG. 1, according to the present invention.

FIG. 2 is an exploded view 200 of FIG. 1. Referring to FIG. 2, the transparent rod 104 is optically coupled to a light source 202. The light source 202 is one or more light-emitting diodes and/or one or more other high efficiency low power light source such as: halogen; krypton; and xenon. The light source 202 comprises any color including white or clear. Light emitted from the light source 202 illuminates the transparent rod 104 and the one or more light tubes 106 along the longitudinal axis of symmetry 402, illustrated in FIG. 4, of the transparent rod 104. Emitted light is received by the transparent rod 104 at a first end 108, and a second end 102 emits light therefrom. The casing 120 houses the light source 202, the switch 112, and the power source interface. In one embodiment the casing 120 is hollow and houses batteries. The batteries are placed into the casing 120 through an access opening 208. The batteries are secured by a spring 204 and the fitting 114 with a thread 206 connection. In another embodiment the batteries are secured by a bias element and the fitting 114.

Figure 3:
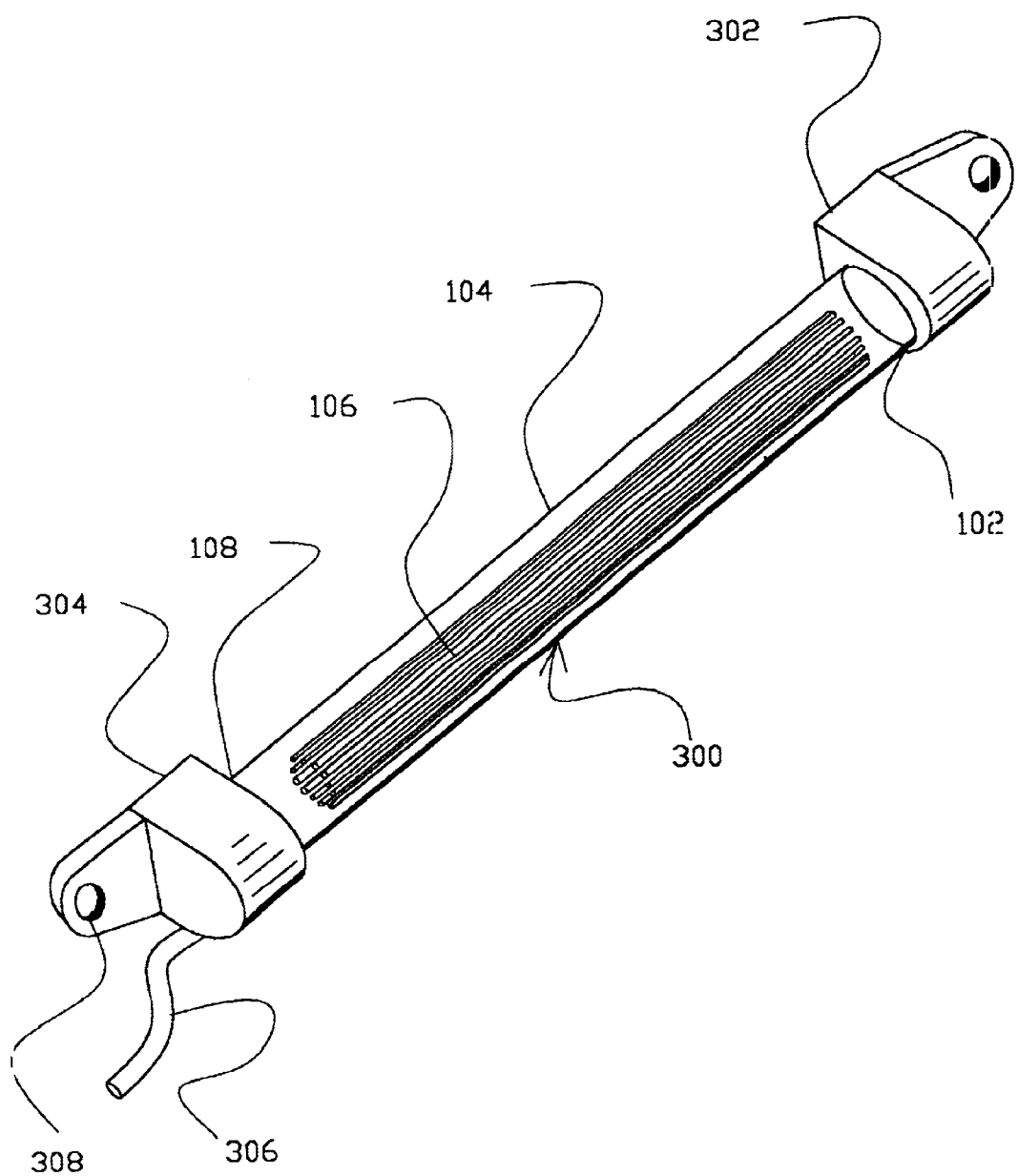
FIG. 3 is an elevated view of the optical fiber light embodied as a mountable light, according to an alternative embodiment of the present invention.

FIG. 3 is an elevated view of the optical fiber light 300 according to a second embodiment of the present invention. Referring to FIG. 3, the optical fiber light comprises a transparent rod 104 wherein light tubes 106 are disposed concentrically along the longitudinal axis of symmetry 402, illustrated in FIG. 4, of the transparent rod 104. A first end 108 of the transparent rod 104 is coupled to a mountable casing 304. The mountable casing 304 houses a light source 202 and power source interface (not shown). The light source 202 is optically coupled to the transparent rod 104 so that light emitted from the light source 202 illuminates the transparent rod 104 and the one or more light tubes 106 along the longitudinal axis of symmetry 402 of the transparent rod 104. A second end 102 of the solid transparent rod 104 is coupled to a mountable housing 302. The mountable housing has an opening 308 for a screw or other fastener (not shown) to mount it to a surface. The mountable housing 302 is manufactured from metal and/or plastic. The power source interface is electrically coupled to a power source 306 such as a power supply, batteries, generator, and equivalent.

Figure 4:
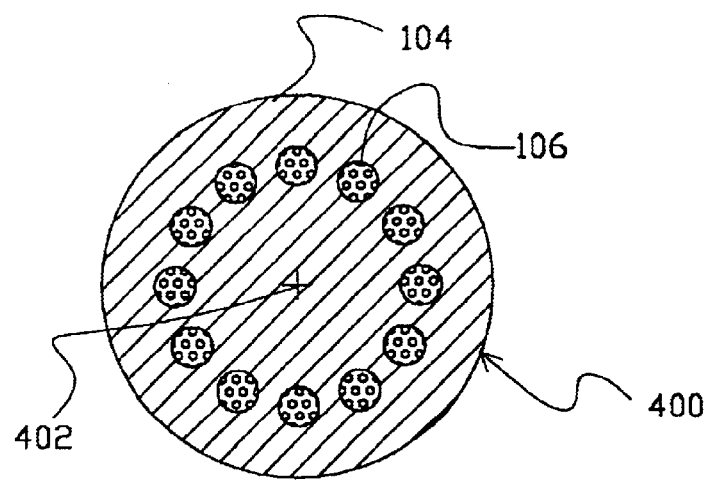
FIG. 4 is a cross-sectional view of the optical fiber light illustrated in FIG. 1 and FIG. 3, according to the present invention.

FIG. 4 is a cross-sectional view 400 of the optical fiber light illustrated in FIG. 1 and FIG. 3. Referring to FIG. 4, the light tubes 106 are arranged concentrically around the longitudinal axis of symmetry 402 of the transparent rod 104. The material of the transparent rod 104 is clear. In another embodiment the material of the transparent rod 104 is tinted. In still another embodiment the light source 202 and transparent rod 104 combine to form a third color. A group of one or more light tubes 106 are disposed within the transparent rod 104. The light tubes 106 are arranged concentrically along the longitudinal axis of symmetry 402 of the transparent rod 104. The light tubes are 106 disposed concentrically along the longitudinal axis of symmetry 402 of the transparent rod 104.

Figure 5:
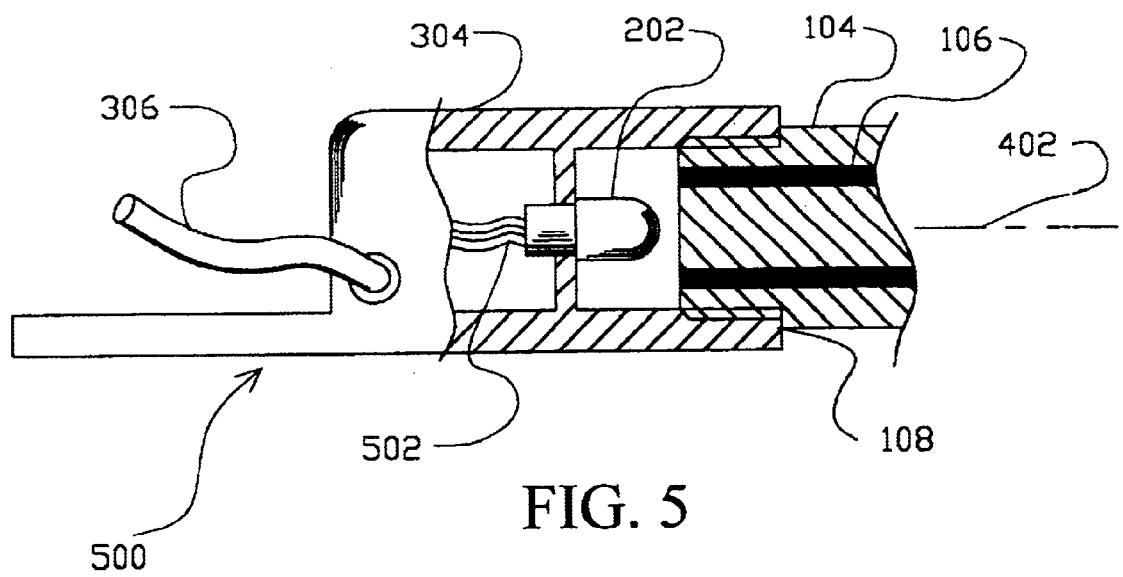
FIG. 5 is a cross-sectional view, of the optical fiber light and casing illustrated in FIG. 3, according to the present invention.

FIG. 5 is a cross-sectional view 500, of the optical fiber light 300 and casing 304 illustrated in FIG. 3. The transparent rod 104 is coupled to the casing 304. Light emitted from the light source 202 is directed along the longitudinal axis of symmetry 402 of the transparent rod 104. The light source 202 leads 502 are electrically coupled to a power source interface. In one embodiment the power source interface is electrically coupled to a power source 306 such as a power supply, one or more batteries, a generator, and equivalent.

Figure 6:
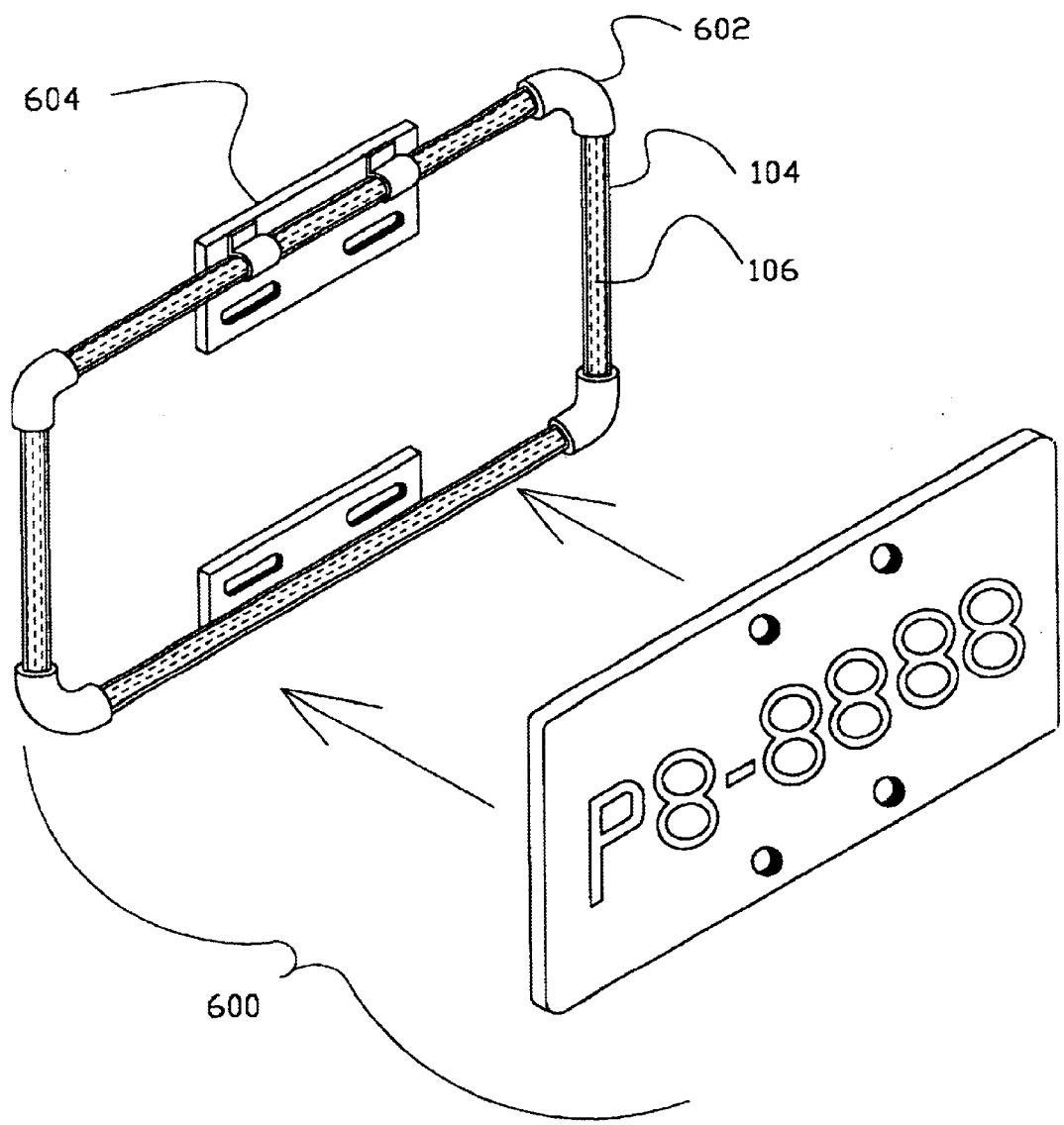
FIG. 6 is an elevated view of the optical fiber light of FIG. 3 embodied as a license plate frame, according to the present invention.

FIG. 6 is an elevated view 600 of the optical fiber light of FIG. 3 according to a third embodiment of the present invention. Referring to FIG. 6, the optical fiber light comprises a transparent rod 104 wherein light tubes 106 are disposed concentrically along the longitudinal axis of symmetry 402, illustrated in FIG. 4, of the solid transparent rod 104. The one or more transparent rods 104 are coupled to a casing 602 and are arranged as a license plate frame attachable by a mounting plate 604. The casing 602 houses the light source 202 and the power source interface (not shown). The mounting plate 604 is manufactured from metal and/or plastic.

Figure 7:
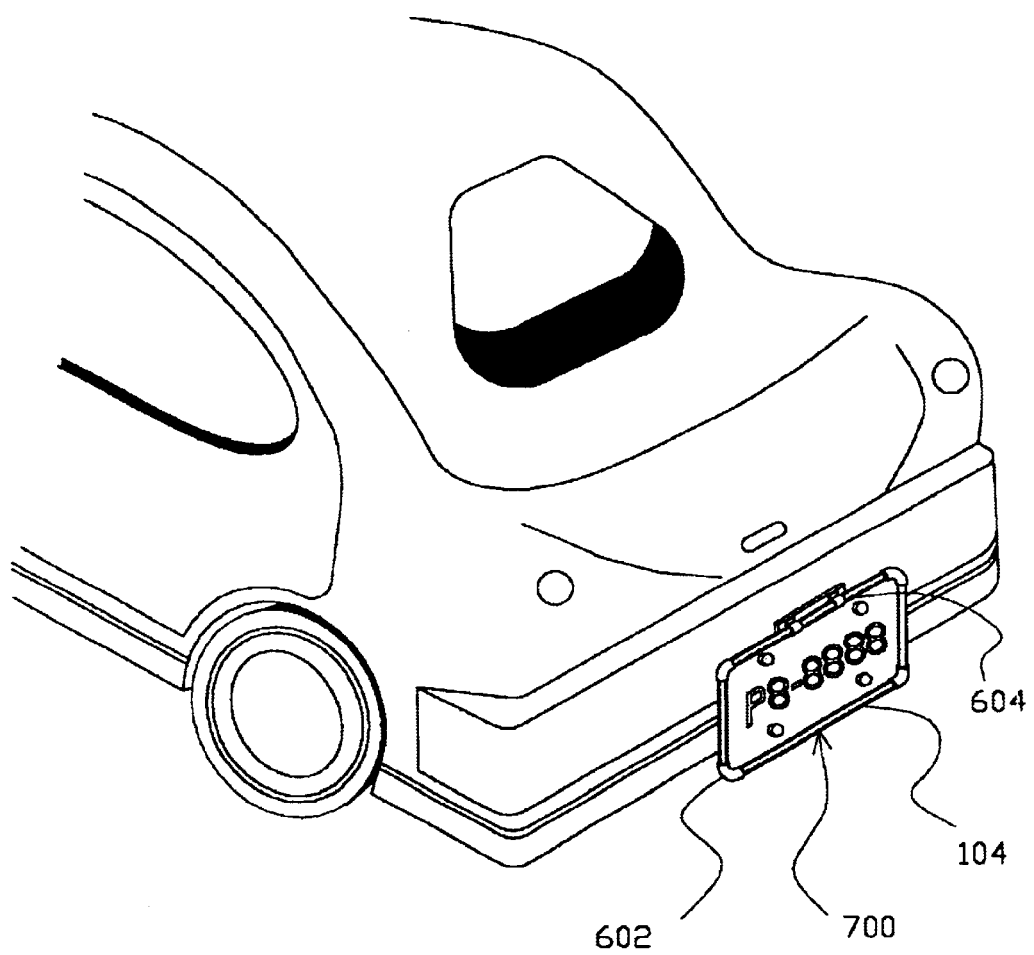
FIG. 7 is a view of the optical fiber light from FIG. 6 embodied as a license plate frame mounted to a vehicle, according to the present invention.

FIG. 7 is a view of the optical fiber light from FIG. 6 illustrating the optical fiber light as a license plate frame 700. The optical fiber light is attached to the automotive vehicle by the mounting plate 604.

Although specific embodiments of the invention have been disclosed, it will be understood by those having skill in the art that changes can be made to this specific embodiment without departing from the spirit and scope of the invention. The scope of the invention is not to be restricted, therefore, to specific embodiments, and it is intended that the appended claims cover any and all such applications, modifications, and embodiments within the scope of the present invention.

What is claimed is:

1. An optical light apparatus comprising:
    at least one light source;
    a transparent rod;
    a power source interface; and
    a casing enclosing the light source and the power source interface, wherein the casing optically couples the transparent rod and the light source so that light emitted from the light source illuminates the transparent rod along a longitudinal axis of symmetry of the transparent rod;
    at least one light tube formed within the transparent rod, the light tube arranged concentrically along the longitudinal axis of symmetry of the transparent rod; and
    the light tube comprises at least one of the following:
        an optical fiber;
        a channel;
    a first casing is attached to a first end of the transparent rod; and
    a second casing is attached to a second end of the transparent rod;
    wherein the optical light apparatus further comprising a license plate frame with two or more sides where each of the two or more sides each contain a transparent rod.

2. The optical light apparatus according to claim 1, wherein the power source interface is electrically coupled to a power source; and
    the power source is at least one of the following:
        a battery;
        a power supply; and
        a generator.

* * * * *